(12) United States Patent
Gibson

(10) Patent No.: US 11,896,000 B1
(45) Date of Patent: Feb. 13, 2024

(54) BLIND COVER

(71) Applicant: Hayden Gibson, Shelton, NE (US)

(72) Inventor: Hayden Gibson, Shelton, NE (US)

(*) Notice: Subject to any disclaimer, the term of this patent is extended or adjusted under 35 U.S.C. 154(b) by 13 days.

(21) Appl. No.: 17/587,509

(22) Filed: Jan. 28, 2022

Related U.S. Application Data

(60) Provisional application No. 63/142,659, filed on Jan. 28, 2021.

(51) Int. Cl.
*A01M 31/02* (2006.01)
*E04H 15/54* (2006.01)
*E04H 15/28* (2006.01)
*E04H 15/00* (2006.01)

(52) U.S. Cl.
CPC ......... *A01M 31/025* (2013.01); *E04H 15/001* (2013.01); *E04H 15/28* (2013.01); *E04H 15/54* (2013.01); *Y10S 135/901* (2013.01)

(58) Field of Classification Search
CPC . A01M 31/025; E04H 15/001; Y10S 135/901
USPC ....................................................... 135/901
See application file for complete search history.

(56) References Cited

U.S. PATENT DOCUMENTS

| | | | | |
|---|---|---|---|---|
| 2,816,297 | A * | 12/1957 | Stanley | A01M 31/025 43/1 |
| 5,458,146 | A * | 10/1995 | Gregg | E04H 15/38 5/413 R |
| 6,698,131 | B2 * | 3/2004 | Latschaw | A01M 31/025 43/1 |
| 8,826,927 | B1 * | 9/2014 | Beam | E04H 15/001 135/901 |
| 9,072,290 | B1 * | 7/2015 | McCauley | A01M 31/025 |
| 9,303,424 | B1 * | 4/2016 | Galloway | B63B 17/02 |
| 10,563,423 | B1 * | 2/2020 | Bird | E04H 15/44 |
| 10,604,960 | B1 * | 3/2020 | Hulsey | A01M 31/025 |
| 2004/0099301 | A1 * | 5/2004 | Zhang | A47C 29/006 5/97 |
| 2010/0229906 | A1 * | 9/2010 | Putman | A01M 31/025 135/96 |
| 2011/0126873 | A1 * | 6/2011 | Desouches | E04H 15/001 135/121 |
| 2012/0125251 | A1 * | 5/2012 | Leonard | B63B 34/05 114/344 |
| 2016/0244990 | A1 * | 8/2016 | Clendaniel | E04H 15/001 |
| 2020/0370326 | A1 * | 11/2020 | Bird | A01M 31/025 |
| 2021/0161123 | A1 * | 6/2021 | Wood | A01M 31/025 |
| 2021/0298287 | A1 * | 9/2021 | Wood | B63B 17/02 |
| 2021/0307314 | A1 * | 10/2021 | Banfield | E04H 15/001 |
| 2022/0022446 | A1 * | 1/2022 | Bell | A01M 31/025 |
| 2022/0162877 | A1 * | 5/2022 | Wood | A01M 31/025 |
| 2022/0361480 | A1 * | 11/2022 | Wood | E04H 15/34 |

* cited by examiner

*Primary Examiner* — Robert Canfield
(74) *Attorney, Agent, or Firm* — Suiter Swantz pc llo

(57) ABSTRACT

A blind cover includes a waterproof layer abutting the ground and a mesh cover. A blind is inserted between the waterproof layer and mesh cover, with the opening of the mesh cover disposed to align with an opening in the blind. The blind and mesh cover are joined together with connection elements such as hook and loop fabric or clips so that the mesh cover and blind can be opened as a singular unit. Environmental plant matter can be inserted between the blind and the mesh cover at any location and at any orientation to produce a more natural look and feel as compared to the current state of the art.

20 Claims, 12 Drawing Sheets

BLIND COVER

PRIORITY

The present application claims the benefit under 35 U.S.C. § 119(e) of U.S. Provisional App. No. 63/142,659 (filed Jan. 28, 2021), which is incorporated herein by reference.

BACKGROUND

Existing blinds include features for blinding in with the surrounding environment. In some instances, those features are simple camouflage print; such blinds are only superficially affective at hiding the user. More advanced systems may include straps that allow the user to place surrounding plant matter on the blind. Those existing systems impose artificial constraints on how plant matter may be placed, and do a poor job retaining the plant matter in the user's desired location (the plant matter slips over time). Alternative blinds may be fabricated with simulated plant matter for a specific environment, but they are not general purpose, and may still not match their surroundings.

It would be advantageous to have a blind cover that allowed a user to reliably place surrounding environmental matter on a blind, in a naturalistic way, and retain it in that desired position and orientation.

SUMMARY

In one aspect, embodiments of the inventive concepts disclosed herein are directed to a blind cover having a waterproof layer abutting the ground and a mesh cover. A blind is inserted between the waterproof layer and mesh cover, with the opening of the mesh cover disposed to align with an opening in the blind. The blind and mesh cover are joined together with connection elements such as hook and loop fabric or clips so that the mesh cover and blind can be opened as a singular unit. Environmental plant matter can be inserted between the blind and the mesh cover at any location and at any orientation to produce a more natural look and feel as compared to the current state of the art.

It is to be understood that both the foregoing general description and the following detailed description are exemplary and explanatory only and should not restrict the scope of the claims. The accompanying drawings, which are incorporated in and constitute a part of the specification, illustrate exemplary embodiments of the inventive concepts disclosed herein and together with the general description, serve to explain the principles.

BRIEF DESCRIPTION OF THE DRAWINGS

The numerous advantages of the embodiments of the inventive concepts disclosed herein may be better understood by those skilled in the art by reference to the accompanying figures in which.

DETAILED DESCRIPTION

Figure 1:
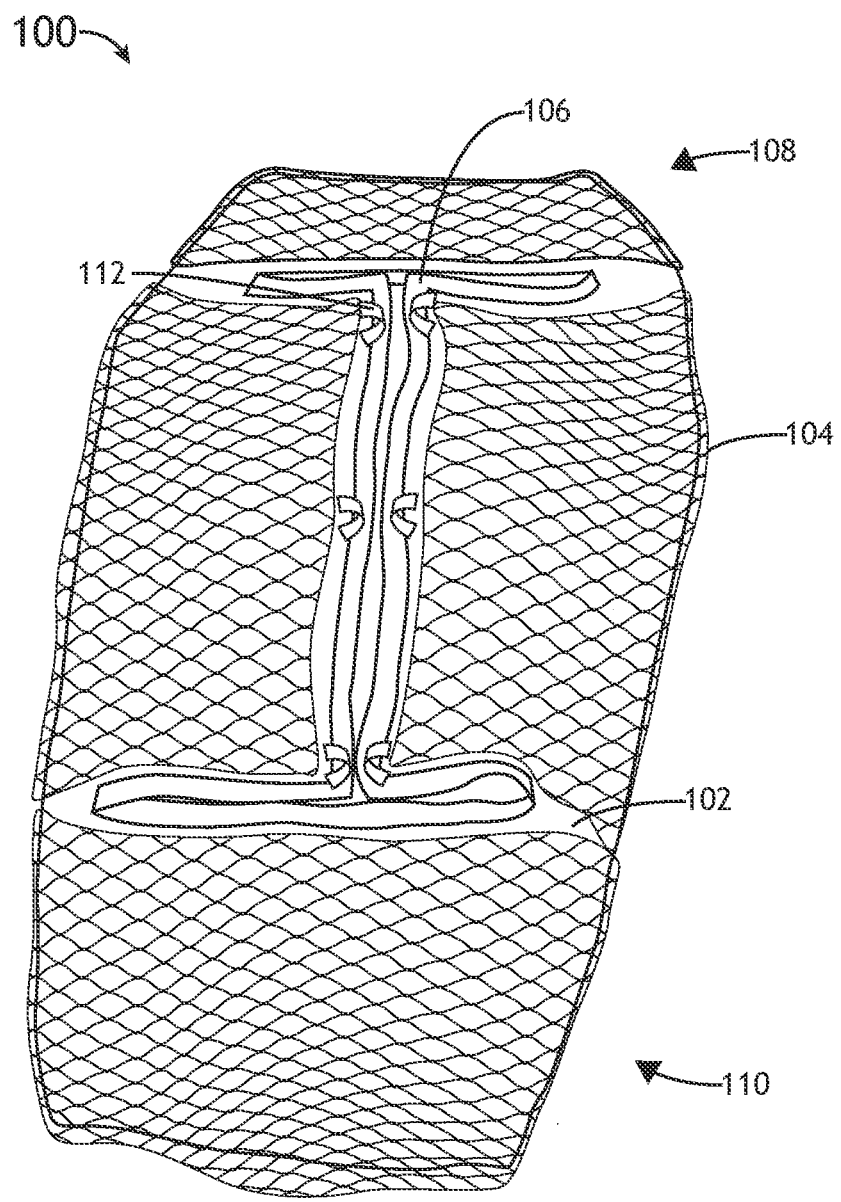
FIG. 1 shows a top view of a blind cover according to an exemplary embodiment.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a blind cover conforming to the shape and size of a standard blind with a mesh exterior. Connection elements attach the blind cover to straps on the blind if they exist, and attach an opening portion of the blind cover to an opening portion of the blind such that the blind cover is integrated with the blind so that the user may enter and exit normally.

Referring to FIG. 1, a top view of a blind cover 100 according to an exemplary embodiment is shown. The blind cover 100 may include a waterproof or water-resistant layer 102 disposed to lay on the ground and receive a blind on top. Mesh cover material 104 is disposed to surround the blind on all sides. A cover opening 106 is disposed at the top of mesh cover 104, corresponding to the opening of a blind to be inserted into the blind cover 100.

In at least one embodiment, the cover opening 106 is defined by one centerline slit in a top surface of the blind cover 100 along a primary axis of the blind cover 100 when deployed for use, and two lateral slits in the top surface, each intersecting the centerline slit at a terminus. The cover opening 106 defines two flaps in the top surface for easy entry and egress, both of a person and a corresponding blind, while retaining the integrity of front, rear and side surfaces.

The mesh cover 104 and portion corresponding to the cover opening 106 may include connection elements 112 to affix the blind cover 100 to the blind. Connection elements 112 retain the blind cover 100 in a desired position and orientation with respect to the blind, and helps to create tension between the mesh cover 104 and the blind when environmental plant matter is inserted between the blind and the mesh cover 104.

In at least one embodiment, the blind cover 100 may define a first end portion 108 and a second end portion 110. The first end portion 108 is configured to enclose one end of the blind while the second end portion 110 is configured to enclose an opposite end of the blind. The end portions 108, 110 securely retain the ends of the blind; a tightly contoured interface between the mesh cover 104 and blind may work to maintain environmental plant matter in a desired position and orientation.

Figure 2A:
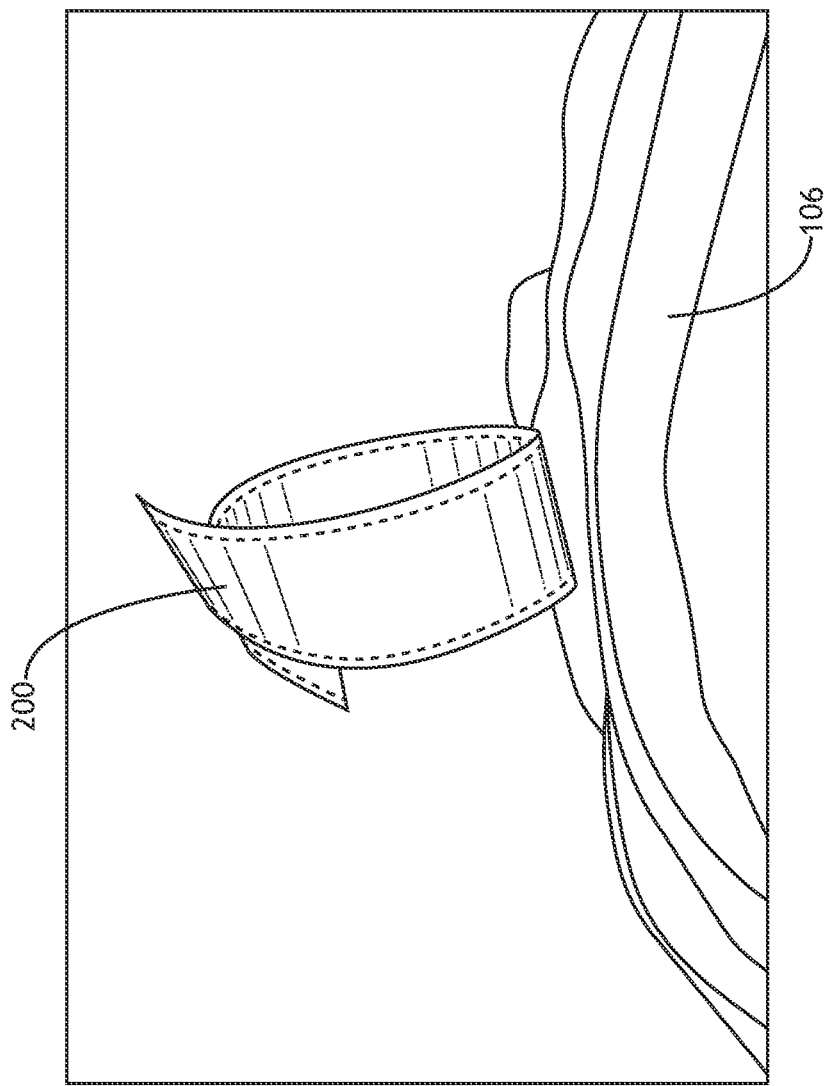
FIG. 2A shows a detail view of a connection element useful for exemplary embodiment.
Figure 2B:
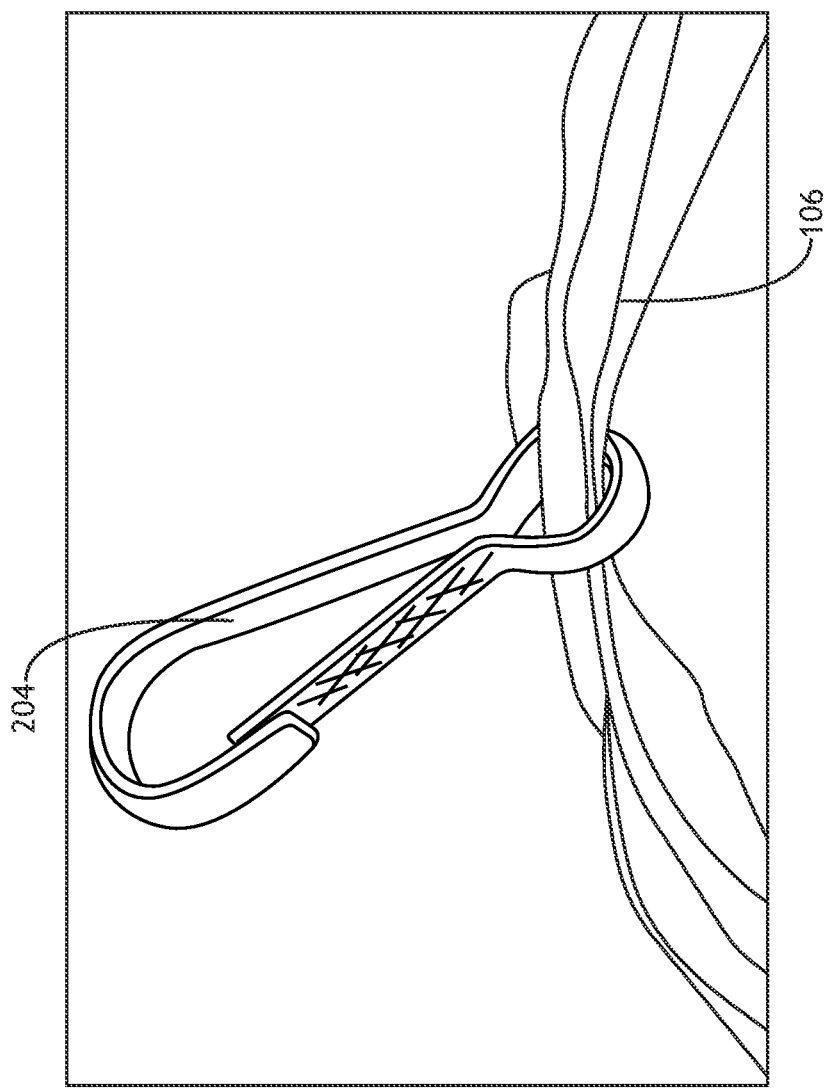
FIG. 2B shows a detail view of a connection element useful for exemplary embodiment.

Referring to FIGS. 2A-2B, detail views of connection elements 200, 204 useful for exemplary embodiment are shown. Connection elements 200, 204 may be periodically disposed around the cover opening 106 and periodically across the entire mesh cover to fix the blind cover to the corresponding blind. The connection element 200, 204 may comprise a strap 200 of hook and loop fabric, snaps, buttons, ties, clips 204, or other element to releasably affix the blind cover to the blind.

Figure 3:
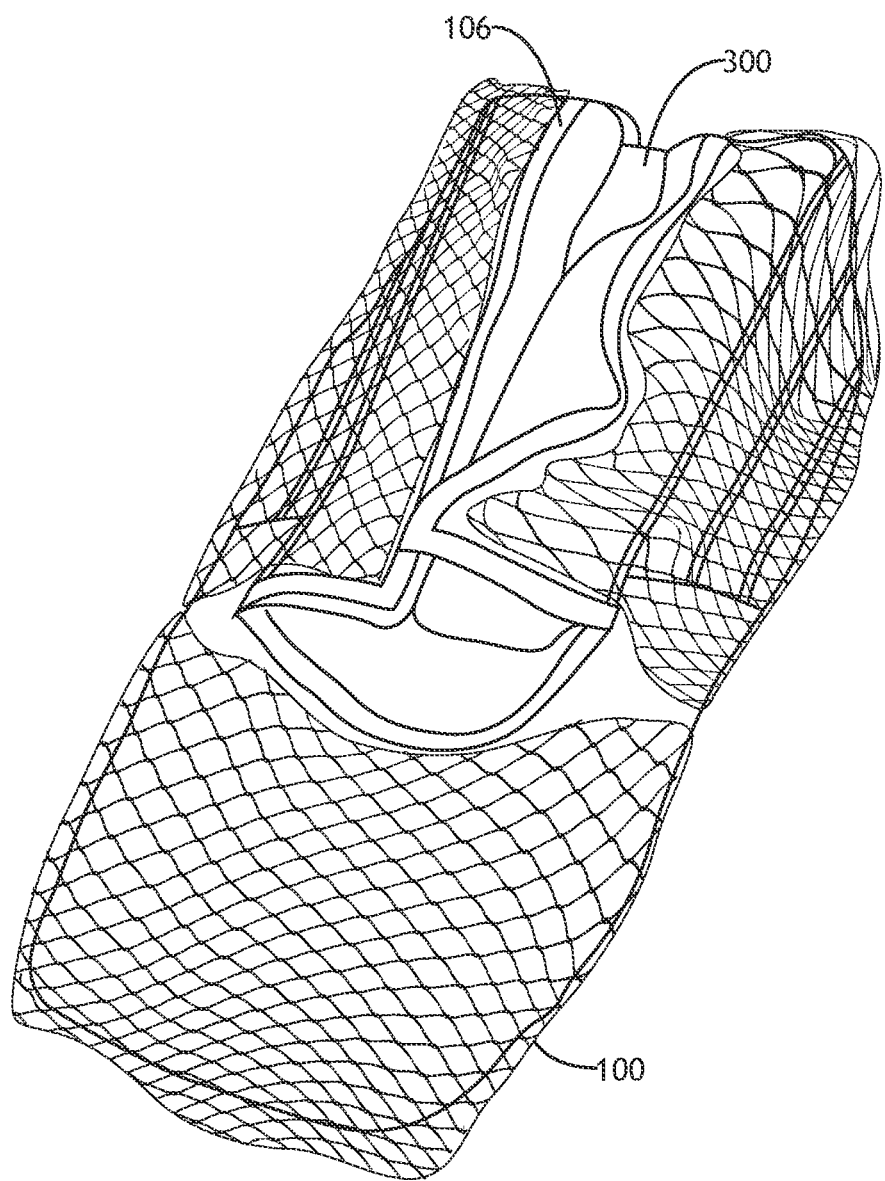
FIG. 3 shows an environmental view of a blind and blind cover according to an exemplary embodiment.
Figure 4A:
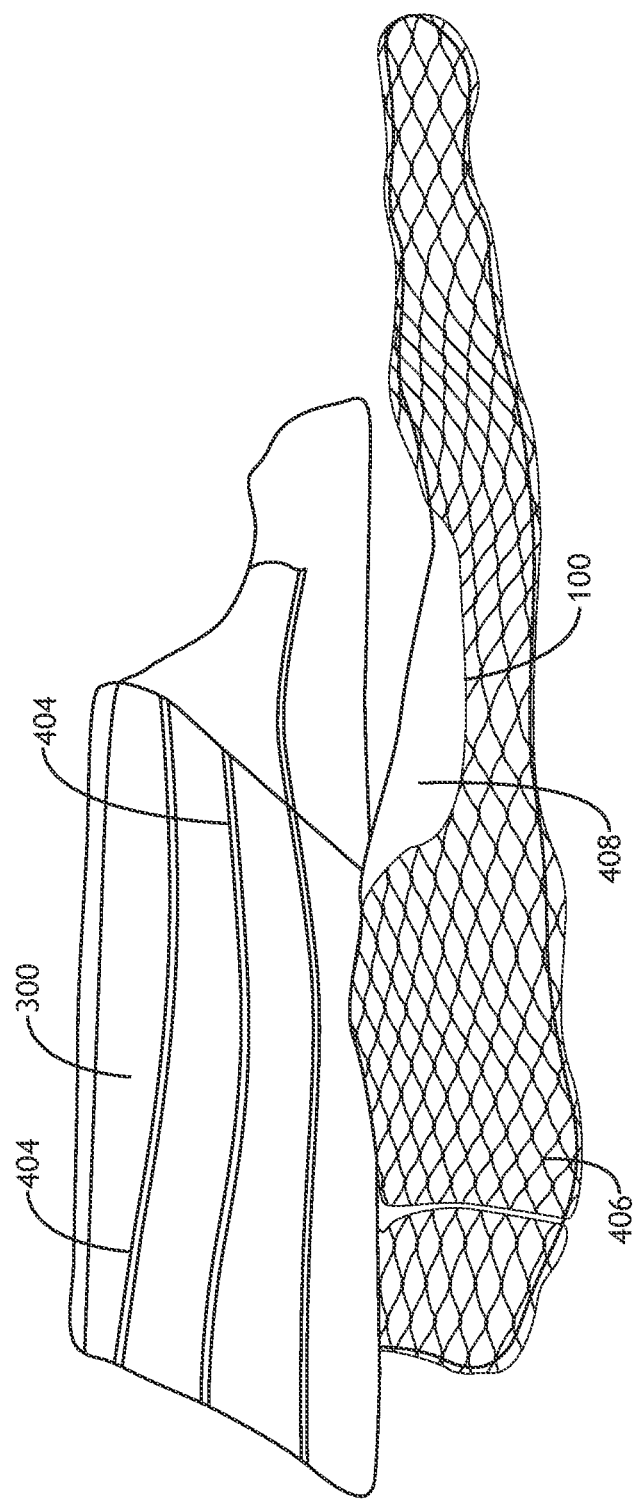
FIG. 4A shows an environmental view of a blind cover according to an exemplary embodiment during a setup process.
Figure 4B:
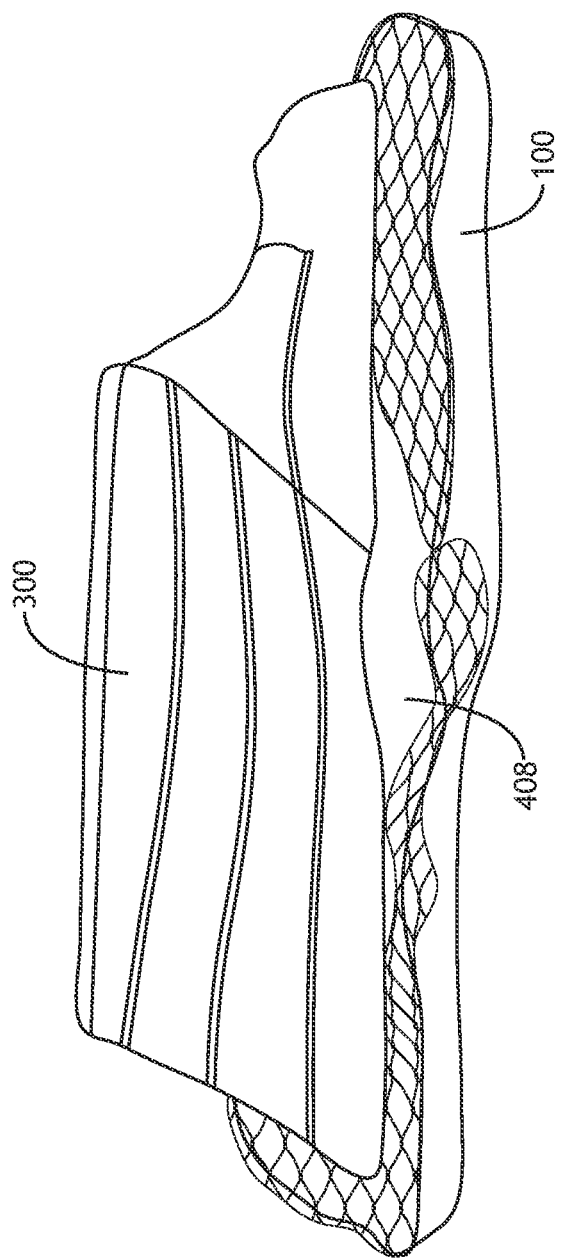
FIG. 4B shows an environmental view of a blind cover according to an exemplary embodiment during a setup process.
Figure 4C:
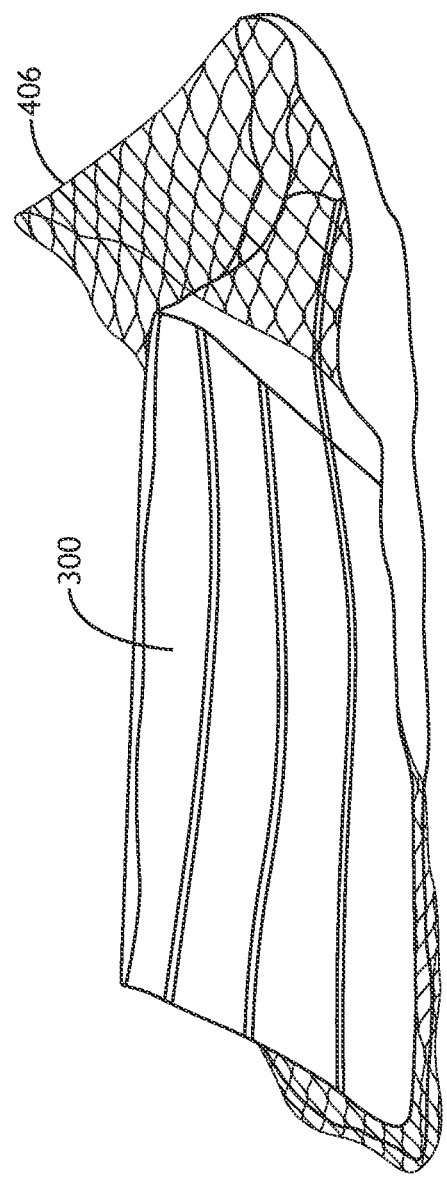
FIG. 4C shows an environmental view of a blind cover according to an exemplary embodiment during a setup process.
Figure 4D:
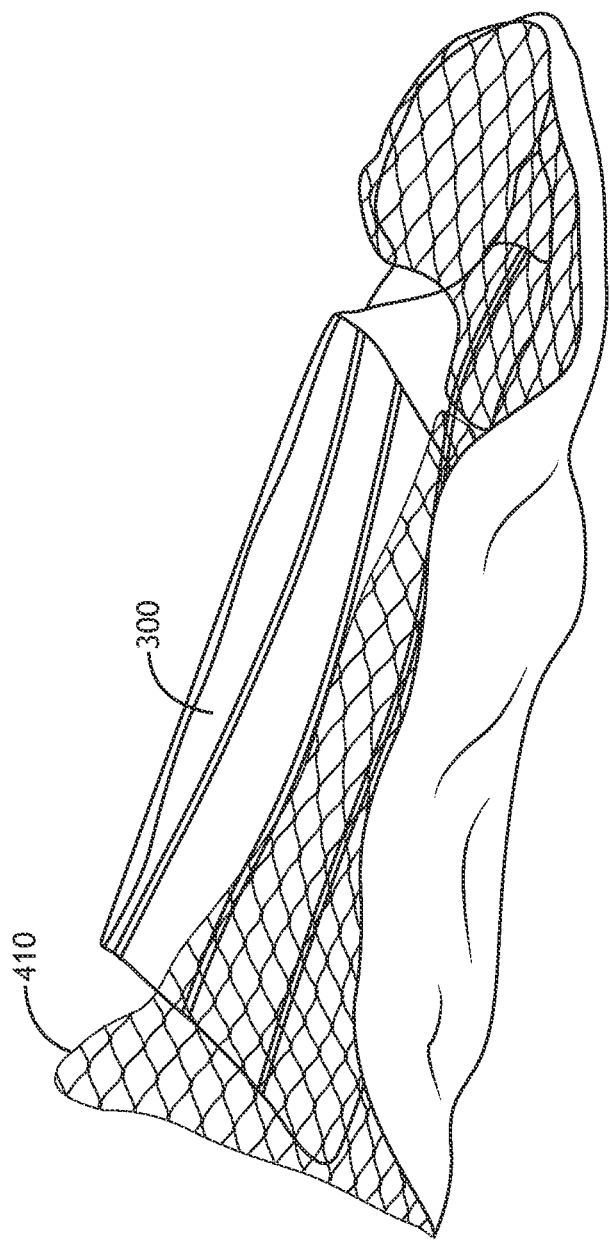
FIG. 4D shows an environmental view of a blind cover according to an exemplary embodiment during a setup process.
Figure 4E:
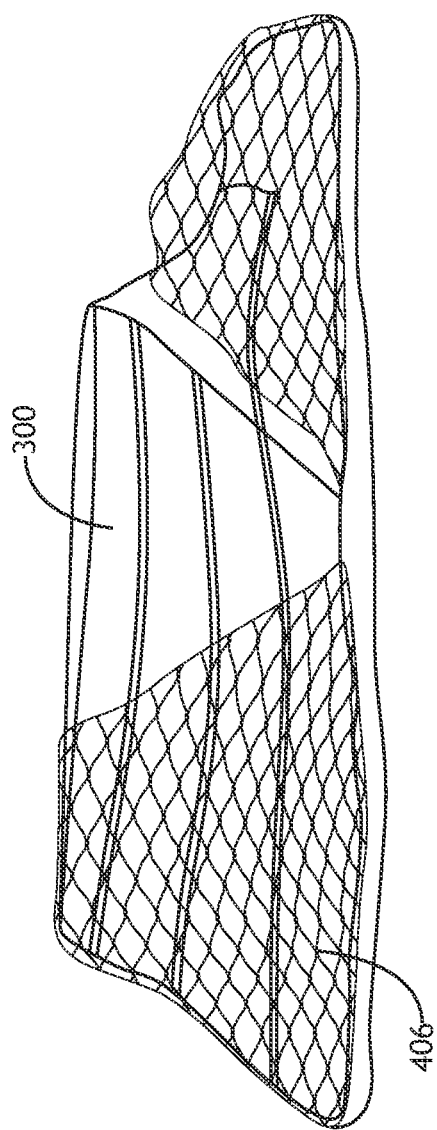
FIG. 4E shows an environmental view of a blind cover according to an exemplary embodiment during a setup process.
Figure 4F:
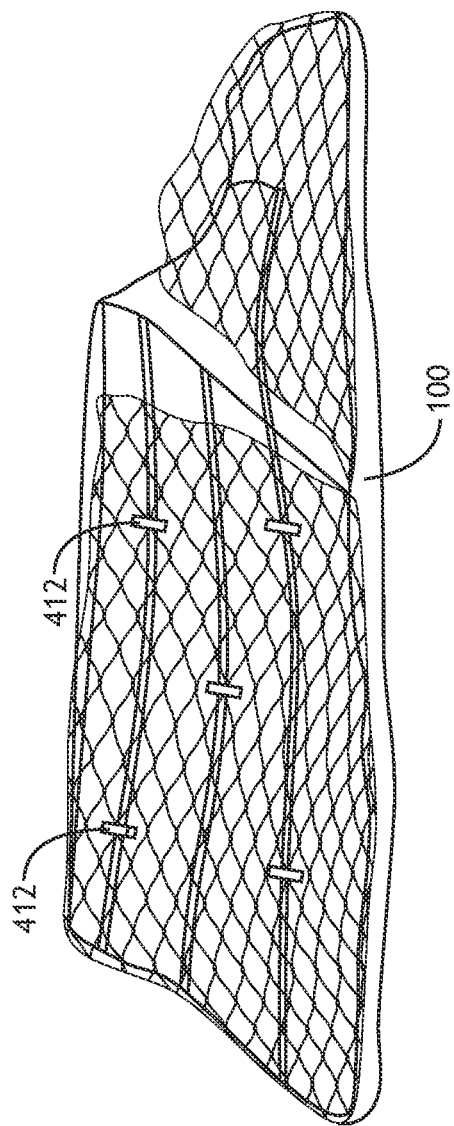
FIG. 4F shows an environmental view of a blind cover according to an exemplary embodiment during a setup process.
Figure 4G:
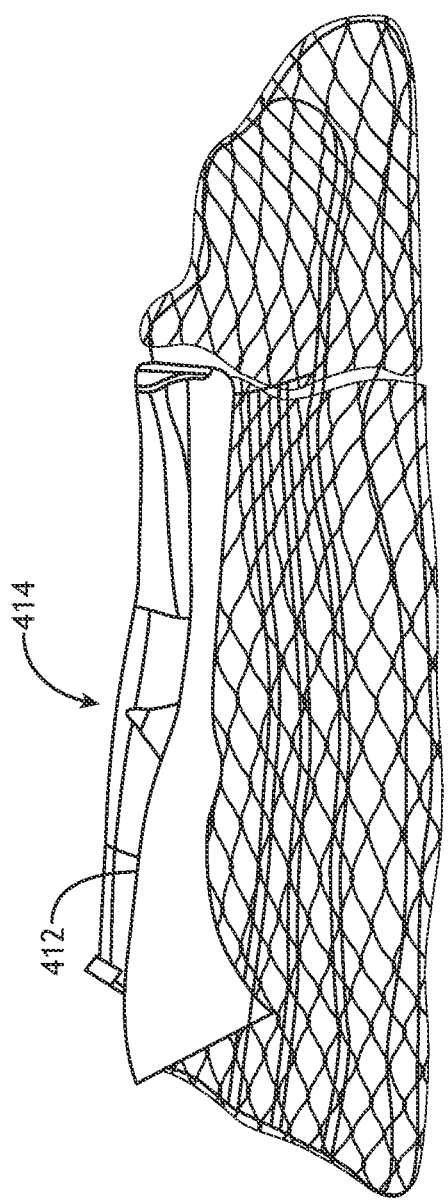
FIG. 4G shows an environmental view of a blind cover according to an exemplary embodiment during a setup process.
Figure 4H:
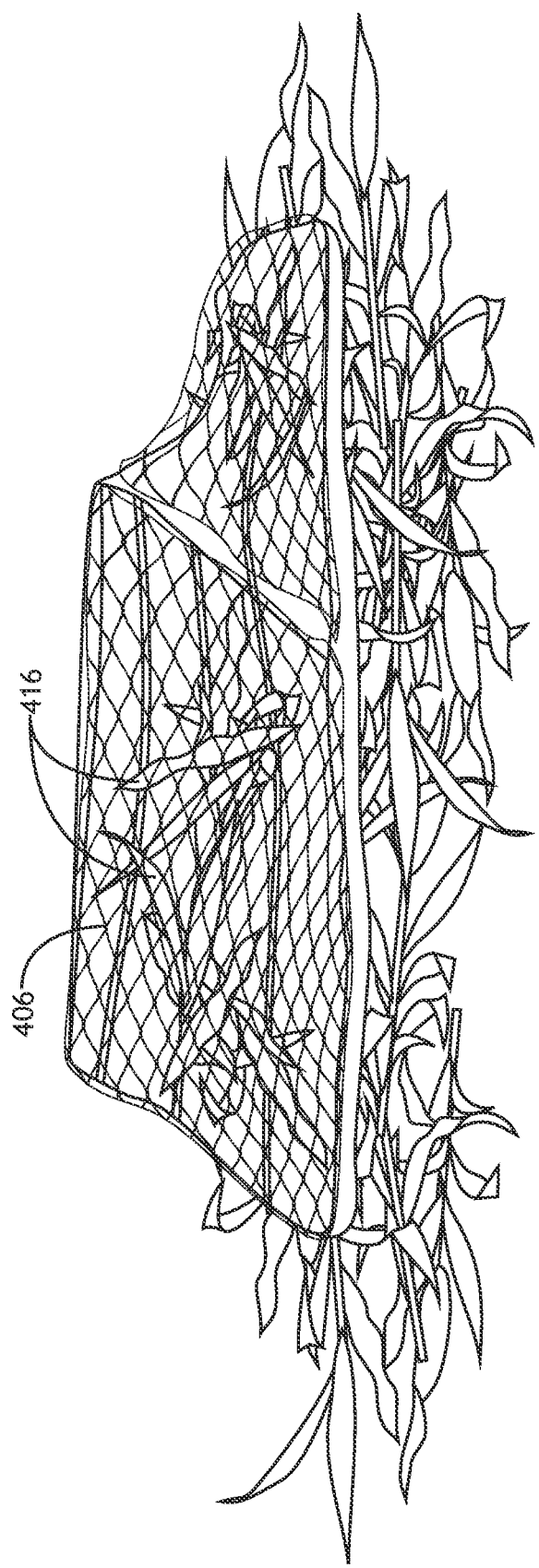
FIG. 4H shows an environmental view of a blind cover according to an exemplary embodiment during a setup process.

Referring to FIG. 3, an environmental view of a blind 300 and blind cover 100 according to an exemplary embodiment is shown. After assembly, the blind cover 100 completely surrounds the blind 300. The cover opening 106 of the blind cover 100 and blind 300 are aligned and secured together such that the blind 300 and blind cover 100 may be operated in concert with no additional steps to get in or out of the combined blind 300/blind cover 100.

In at least one embodiment, a blind 300 and blind cover 100 may be closely defined with respect to each other such that the blind 300 and blind cover 100 are specifically made to interconnect with specific connection points and connection elements disposed to coincide. In such embodiments, the blind 300 and blind cover 100 may define a kit to be manufactured and sold together, though the blind 300 may be separately useful.

Existing blinds often include localized features to receive environmental plant matter for camouflage. Such features only allow plant matter to be inserted in limited locations and orientations. In at least one embodiment, the connection elements of the blind cover 100 are disposed to engage these localized features to secure the blind 300 to the blind cover 100.

In at least one embodiment, the blind cover 100 may be configured with connection elements disposed in a plurality of locations to correspond to features on multiple different blinds 300 for a universal blind cover 100. Furthermore, the connection elements may be specifically disposed to avoid features on a corresponding blind 300 such as closures for the cover opening 106.

Referring to FIGS. 4A-4H, environmental views of a blind cover 100 according to an exemplary embodiment during a setup process are shown. During setup, a blind cover 100 is disposed at a desired location in the environment with the waterproof or water-resistant layer 408 disposed on the ground. The blind 300 is then inserted into the blind cover 100 through an opening 410 in the blind cover 100. The shape and size of the blind cover 100 conforms to the shape and size of the blind 300, with the opening of the blind cover 100 aligned to the opening of the blind 300.

Once the blind 300 is inserted into the blind cover 100, a mesh cover 406 surrounds the blind 300 on all sides. A reinforced portion may be disposed at the opening 410, with connection elements disposed at the opening 410 to affix the opening 410 of the blind cover 100 to the opening of the blind 300. Furthermore, connection elements 412 may be periodically disposed on the mesh cover 406 to affix portions of the mesh cover 406 to existing straps 404 or other known features on the blind 100. Such straps 404 are often regularly disposed to allow a user to insert environmental plant matter on-site, but force a specific, unnatural location and orientation of such environmental plant matter; they also provide insufficient contact to hold the environmental plant matter in place.

When the blind 300 is completely installed in the blind cover 100, the blind 300 and blind cover 100 can be opened 414 in unison with a singular action. The user may then easily enter and exit the blind 300 as usual.

Once the blind cover 100 surrounds and is affixed to the blind 300, environmental plant matter 416 may be collected and inserted between the blind 300 and mesh cover 406, anywhere and in any orientation to simulate the natural surroundings. The mesh cover 406 provides significantly more and consistent contact between the environmental plant matter 416 and the blind 300, while also obscuring the environmental plant matter less than the existing straps 404.

Entering and exiting the combined blind 300 and blind cover 100 will not disturb the environmental plant matter 416. Furthermore, existing straps 404 may require environmental plant matter 416 of a particular size while the mesh cover 406 may accommodate environmental plant matter 416 of almost any size.

It is believed that the inventive concepts disclosed herein and many of their attendant advantages will be understood by the foregoing description of embodiments of the inventive concepts disclosed, and it will be apparent that various changes may be made in the form, construction, and arrangement of the components thereof without departing from the broad scope of the inventive concepts disclosed herein or without sacrificing all of their material advantages; and individual features from various embodiments may be combined to arrive at other embodiments. The form herein before described being merely an explanatory embodiment thereof, it is the intention of the following claims to encompass and include such changes. Furthermore, any of the features disclosed in relation to any of the individual embodiments may be incorporated into any other embodiment.

What is claimed is:

1. A blind cover comprising:
    a mesh cover defining an opening, the opening disposed to correspond to an opening of a corresponding blind, the mesh cover configured to completely enclose the blind when deployed;
    a plurality of opening connection elements disposed at the opening of the mesh cover, configured to affix the mesh cover to the corresponding blind at the opening of each of the mesh cover and corresponding blind; and
    a plurality of connection elements disposed on the mesh cover configured to affix the mesh cover to the blind at locations corresponding to locations of connection points disposed on the blind and support the insertion of environmental plant matter at any location and at any orientation between the mesh cover and the corresponding blind.

2. The blind cover of claim 1, wherein the plurality of connection elements each comprise hook and loop fabric.

3. The blind cover of claim 1, wherein the plurality of connection elements each comprise deformable clips.

4. The blind cover of claim 1, wherein the mesh cover defines a first end portion configured to fully enclose a front of the corresponding blind and a second end portion configured to fully enclose a rear of the corresponding blind.

5. The blind cover of claim 1, further comprising a waterproof layer, wherein the mesh cover is disposed atop the waterproof layer when deployed.

6. The blind cover of claim 1, wherein the opening is defined a centerline slit along a primary axis of the blind cover and two lateral slits, each intersecting a separate terminus of the centerline slit.

7. The blind cover of claim 1, wherein the connection points disposed on the blind comprise elements of the blind configured to receive environmental plant matter when a blind cover is not present.

8. A blind system comprising:
    a blind defining:
        a blind opening; and
        a plurality of connection points;
    a mesh cover defining an opening, the opening disposed to correspond to the blind opening, the mesh cover configured to completely enclose the blind when deployed;
    a plurality of opening connection elements disposed at the opening of the mesh cover, configured to affix the mesh cover to corresponding connection points in the plurality of connection points disposed proximal to the blind opening; and
    a plurality of connection elements disposed on the mesh cover configured to affix the mesh cover to the blind at locations corresponding to locations of connection points disposed on the blind and support the insertion of environmental plant matter at any location and at any orientation between the mesh cover and the corresponding blind.

9. The blind system of claim 8, wherein the plurality of connection elements each comprise hook and loop fabric.

10. The blind system of claim 8, wherein the plurality of connection elements each comprise deformable clips.

11. The blind system of claim 8, wherein the mesh cover defines a first end portion configured to fully enclose a front of the blind and a second end portion configured to fully enclose a rear of the blind.

12. The blind system of claim 8, further comprising a waterproof layer, wherein the mesh cover is disposed atop the waterproof layer and the blind is disposed between the waterproof layer and the mesh cover when deployed.

13. The blind system of claim 8, wherein the opening is defined a centerline slit along a primary axis of the blind cover and two lateral slits, each intersecting a separate terminus of the centerline slit.

14. The blind system of claim 8, wherein the plurality of connection points comprise elements of the blind configured to receive environmental plant matter when a blind cover is not present.

15. A kit comprising:
    a blind defining:
        a blind opening; and
        a plurality of connection points;
    a mesh cover defining an opening, the opening disposed to correspond to the blind opening, the mesh cover configured to completely enclose the blind when deployed;
    a plurality of opening connection elements, the plurality of connection elements comprising:
        a first set of connection elements disposed at the opening of the mesh cover, configured to affix the mesh cover to corresponding connection points in the plurality of connection points disposed proximal to the blind opening; and
        a second set of connection elements disposed on the mesh cover configured to affix the mesh cover to the blind at locations corresponding to locations of connection points disposed on the blind and support the insertion of environmental plant matter at any location and at any orientation between the mesh cover and the blind.

16. The kit of claim 15, wherein the plurality of connection elements each comprise hook and loop fabric.

17. The kit of claim 15, wherein the plurality of connection elements each comprise deformable clips.

18. The kit of claim 15, wherein the mesh cover defines a first end portion configured to fully enclose a front of the blind and a second end portion configured to fully enclose a rear of the blind.

19. The kit of claim 15, further comprising a waterproof layer, wherein the mesh cover is disposed atop the waterproof layer and the blind is disposed between the waterproof layer and the mesh cover when deployed.

20. The kit of claim 15, wherein the opening is defined a centerline slit along a primary axis of the blind cover and two lateral slits, each intersecting a separate terminus of the centerline slit.

* * * * *